United States Patent
Boyes

(10) Patent No.: US 10,393,610 B2
(45) Date of Patent: Aug. 27, 2019

(54) PIPELINE LEAK DETECTION APPARATUS

(71) Applicant: Advanced Engineering Solutions Ltd., Cramlington Northumberland (GB)

(72) Inventor: David Boyes, Cramlington Northumberland (GB)

(73) Assignee: Advanced Engineering Solutions Ltd, Cramlington, Northumberland (GB)

( * ) Notice: Subject to any disclaimer, the term of this patent is extended or adjusted under 35 U.S.C. 154(b) by 86 days.

(21) Appl. No.: 15/503,340

(22) PCT Filed: Aug. 11, 2015

(86) PCT No.: PCT/GB2015/052315
§ 371 (c)(1),
(2) Date: Feb. 10, 2017

(87) PCT Pub. No.: WO2016/024102
PCT Pub. Date: Feb. 18, 2016

(65) Prior Publication Data
US 2018/0149546 A1    May 31, 2018

(30) Foreign Application Priority Data
Aug. 11, 2014  (GB) .................................. 1414206.1

(51) Int. Cl.
*G01M 3/00* (2006.01)
*G01M 3/24* (2006.01)
*G01M 3/28* (2006.01)

(52) U.S. Cl.
CPC ............ *G01M 3/005* (2013.01); *G01M 3/246* (2013.01); *G01M 3/2823* (2013.01)

(58) Field of Classification Search
CPC ..... G01M 3/005; G01M 3/2823; G01M 3/246
See application file for complete search history.

(56) References Cited

U.S. PATENT DOCUMENTS

| | | | |
|---|---|---|---|
| 2002/0190682 A1* | 12/2002 | Schempf ............... | G01M 3/005 318/568.11 |
| 2006/0101915 A1* | 5/2006 | Thompson ............ | G01M 3/246 73/592 |
| 2012/0312078 A1* | 12/2012 | Bakhtiar ................ | G01N 29/14 73/40.5 A |
| 2015/0179044 A1* | 6/2015 | Wu ........................ | G08B 21/20 370/311 |

FOREIGN PATENT DOCUMENTS

| | | |
|---|---|---|
| EP | 0161689 A2 | 11/1985 |
| WO | WO 02/070943 A2 | 9/2002 |
| WO | WO 2008/149092 A1 | 12/2008 |
| WO | WO 2012/101646 A1 | 8/2012 |

* cited by examiner

*Primary Examiner* — Paul M. West
(74) *Attorney, Agent, or Firm* — GableGotwals

(57) ABSTRACT

This invention relates to a device and method which can be used to detect the location of one or more leaks within a pipeline, by passing the device along the interior of the pipeline. The device includes audio detection means to detect the presence of leaks. Surface mounted apparatus is also provided to allow the passage of the device along the pipeline to be monitored and the position of the device with respect to the pipeline to be detected.

20 Claims, 2 Drawing Sheets

PIPELINE LEAK DETECTION APPARATUS

CROSS-REFERENCE TO RELATED APPLICATIONS

This application is the United States National Phase of Patent Application No. PCT/GB2015/052315filed 11 Aug. 2015, which claims priority to British Patent Application No. 1414206.1 filed 11Aug. 2014, each of which are incorporated herein by reference.

BACKGROUND OF THE INVENTION

The invention to which this application relates is a device and method which can be used to detect the location of one or more leaks within a pipeline, by passing said device along the interior of the pipeline.

It is well-known that pipelines located underground and which carry fluids, typically liquids, therein have the tendency, over time, to develop leaks. For example, in the water industry, the leaks can cause significant loss of water and can also lead to the water company in charge of the pipeline coming under adverse pressure, especially in periods of water shortage. There has therefore been a need for sometime to be able to determine, firstly, the occurrence of a leak along a length of pipeline and, secondly, to accurately determine the location of the leak within that pipeline. However, in practice, conventionally, it has been the case of visually inspecting the earth above a buried pipeline, to try and identify indications of leakage of fluid therefrom or alternatively, to excavate the pipeline, which is an expensive and time consuming operation and may not lead to the identification of the leak.

It is known from other prior art to provide detection devices which can pass along the interior of a pipeline. An example of such a device is disclosed in International Patent Application WO 2008/149092, wherein the described device is provided of at least two parts and with a smooth continuous outer surface so as to allow the device to be carried along the pipeline to be checked by the fluid of the flow alone with a minimum of contact and possible dislodgement of debris from the pipeline wall. The device includes a cavity in which detection apparatus is housed and allows signals indicative of its position to be sent to the surface. However, such a device still suffers from the ability to accurately determine the exact location of the device within the pipeline as it moves therethrough.

An aim of the present invention is therefore to provide a device of a type which can be supported and propelled by a fluid along a pipeline, said device having further improvements made thereto relating to the ability with which an operator can track and accurately locate the position of the said device.

According to a first aspect of the present invention there is provided apparatus for detecting one or more parameters of a pipeline, said apparatus including a device having a housing; a cavity defined within said housing; a plurality of detection components located within said cavity, said housing formed from at least two parts engaged in a sealed manner and forming a substantially continuous external wall of the device, wherein said device further comprises an accelerometer located within said cavity to indicate changes in the velocity and/or location of the device as it moves along the interior of the pipeline.

In one embodiment, said accelerometer is provided to indicate a change in velocity of the device. Such a change in velocity can then be attributed to various features of the pipeline through which the device passes, for example, bends of varying degrees, or changes in the diameter of the pipeline through which the device passes. Typically, the detection of such features of the pipeline will provide a more accurate determination of the device within the pipeline.

In one embodiment, the accelerometer is provided in order to ascertain the location of the device within the pipeline.

In one embodiment, said accelerometer is provided as a 3-axis accelerometer. Typically, said accelerometer is capable of measuring +/−16 g at up to 3200 Hz.

Typically, said device may be switched to access the interior of the device to actuate a switch prior to launching the device and switches the same off once the device has been removed from the pipeline by again accessing the switch on the interior of the device.

In one embodiment, the device is provided with a removable data storage means. Typically, said removable data storage means is provided as a memory card. Further typically, said memory card is provided as a non-volatile memory card. Yet further typically, said memory card is provided as a Secure Digital (SD) card.

In one embodiment, data obtained by said accelerometer is stored on removable data storage means located within the device. Typically, said removable data storage means is provided as a Secure Digital (SD) card.

In one embodiment, the device includes acoustic detection means located within said cavity. Typically, said acoustic detection means are in the form of an audio detection device such as a microphone.

In one embodiment, the acoustic detection means are further provided with amplifying means. Typically, said amplifying means are provided to amplify an input signal for an analogue-to-digital converting means, also provided with the acoustic detection means.

In one embodiment, audio filtering means are provided with said acoustic detection means. Typically, said audio filtering means are in the form of one or more low-pass and/or high-pass filters. Thus, the provision of audio filtering means serves to amplify, pass or attenuate selected frequencies, improving the quality of the acoustic data obtained by said acoustic detection means.

In one embodiment, said low-pass and/or high-pass filters may have fixed values or be programmable to a required value.

In one embodiment, acoustic data obtained by said acoustic detection means is stored on removable data storage means located within the device. Typically, said removable data storage means is provided as a Secure Digital (SD) card.

In one embodiment, the device can be programmed to record acoustic data for a predetermined duration of time. Typically, the predetermined duration of time is based on a predicted duration of time the device will take to travel between selected points in the pipeline.

In one embodiment, the device is provided with at least one data transfer connection means. Typically, said data transfer connection means is in the form of one or more USB ports. Typically, said one or more USB ports are provided as USB mini ports.

In one embodiment, said one or more USB ports are provided for the transfer of data. Typically, said transfer of data will be between the device and a PC, laptop, smartphone and/or the like. Alternatively, or in addition, said one or more USB ports are provided to enable charging of a power supply associated with the device.

In one embodiment, the device is provided with a power supply located within the housing. Typically, said power supply is a rechargeable power supply.

In one embodiment, said power supply includes one or more batteries. Typically, said batteries are in the form of one or more AA type NiMH batteries.

In one embodiment, the device is provided with a real-time clock. Typically, said clock will retain the time for as long as a power supply is connected to the device. Further typically, the time of said clock can be input/adjusted by a user.

In one embodiment, the device may be provided in varying sizes according to the size/diameter of the pipeline through which it is to be inserted. Typically, the device will be sized to fit within the pipeline though will be of a size greater than that of any secondary pipelines branched from the main pipeline.

In one embodiment, the device is provided with an electromagnetic coil and control means for said coil. Typically, said coil facilitates the transmission and reception of data from a second electromagnetic coil located at an external location.

In one embodiment, the device is provided with substantially neutral buoyancy in a fluid that passes along the pipeline, such that the device is carried by the fluid along the pipeline, and the acoustic data which is collected is used to generate an indication of any leakage that may be occurring from the pipeline and also to provide an indication of the particular location of the device and hence allow the calculation of the location of the leakage to be achieved. This arrangement allows the device to be carried by the fluid and, therefore, the device does not need to be provided with any guide means so as to guide the position of the same in the pipeline and also does not need to be provided with any propulsion means as the movement of the fluid allows the device to be propelled along the pipeline.

In one embodiment, a signal emitted from the electromagnetic coil is received by a second electromagnetic coil located within a detection means at a fixed location. Typically, said fixed location is above ground and substantially directly above the pipeline through which the device is travelling.

In one embodiment, two or more detection means are located at fixed locations along at least part of the length of the pipeline.

In one embodiment, said detection means further includes a general packet radio service (GPRS) modem and/or a global positioning system (GPS). Thus, as the device passes along a portion of the pipeline where a detection means is located above-ground, the detection means detects the presence of the device via data received through the electromagnetic coils and subsequently provides a time-stamp and location for such a detection event. Provision of a GPRS modem allows the detection means to send, for example, one or more SMS messages and or internet data relating to the device/detection event. Typically, said detection means is programmed to send such data to one or more mobile phones and/or servers.

In one embodiment, the detection means further includes audio output means. Typically, said audio output means will emit a sound when a detection event occurs. Further typically, the acoustic detection means provided with the device will "hear"/pick up the said sound as it passes through the relevant portion of the pipeline. Thus, the sound is recorded on the obtained audio data, allowing a user to more accurately assess the location of the device and, subsequently, the location of any leaks within the pipeline relative to the detection means which emits a sound.

According to a further aspect of the present invention, there is provided an apparatus for detecting one or more parameters in a pipeline, said apparatus including a device having a housing; a cavity defined within said housing; a plurality of detection components located within said cavity including acoustic detection means, said housing formed from at least two parts engaged in a sealed manner and forming a substantially continuous external wall of the device, wherein said acoustic detection means further comprises audio filtering means.

In one embodiment, said audio filtering means are provided in the form of one or more low-pass and/or high-pass filters. Thus, the provision of audio filtering means serves to amplify, pass or attenuate selected frequencies, improving the quality of the acoustic data obtained by said acoustic detection means.

In one embodiment, said acoustic detection means are in the form of a microphone.

In one embodiment, the acoustic detection means are further provided with amplifying means. Typically, said amplifying means are provided to amplify an input signal for an analogue-to-digital converting means, also provided with the acoustic detection means.

According to another aspect of the present invention, there is provided A method for the detection of one or more parameters in a pipeline, said method including inserting a device into said pipeline, said device having a plurality of detection components located therein and the device being formed from at least two parts engaged in a sealed manner to form a substantially continuous external wall of the device; providing detection means at one or more locations along the path of said pipeline and externally thereof, said detecting means detecting the presence of the device within the pipeline as it passes within a predetermined proximity of the detection means, and wherein said device includes an accelerometer located therein, a first electromagnetic coil and control means for the same. Typically, said electromagnetic coil to facilitate the transmission and reception of data between said first electromagnetic coil and an electromagnetic coil provided as part of said detecting means.

In one embodiment, the device is provided with a first electromagnetic coil and control means for said coil. Typically, said electromagnetic coil facilitates the transmission and reception of data from a second electromagnetic coil located in the one or more detection means.

In one embodiment, said fixed location is above ground and substantially directly above the pipeline through which the device is travelling.

In one embodiment, two or more detection means are located at fixed locations along at least part of the length of the pipeline.

In one embodiment, said one or more detection means further include a general packet radio service (GPRS) modem and/or a global positioning system (GPS). Typically, said detection means are programmed to send such data to one or more mobile phones and/or servers.

It should be noted that although the use of the device is of particular advantage in relation to the determination of the occurrence of leakages within a pipeline, the device can be used for other purposes in which the detection of acoustical noise is of advantage and there is a need to determine the particular location of the occurrence of the noise.

Embodiments of the present invention will now be described with reference to the accompanying figures, wherein.

Figure 1:
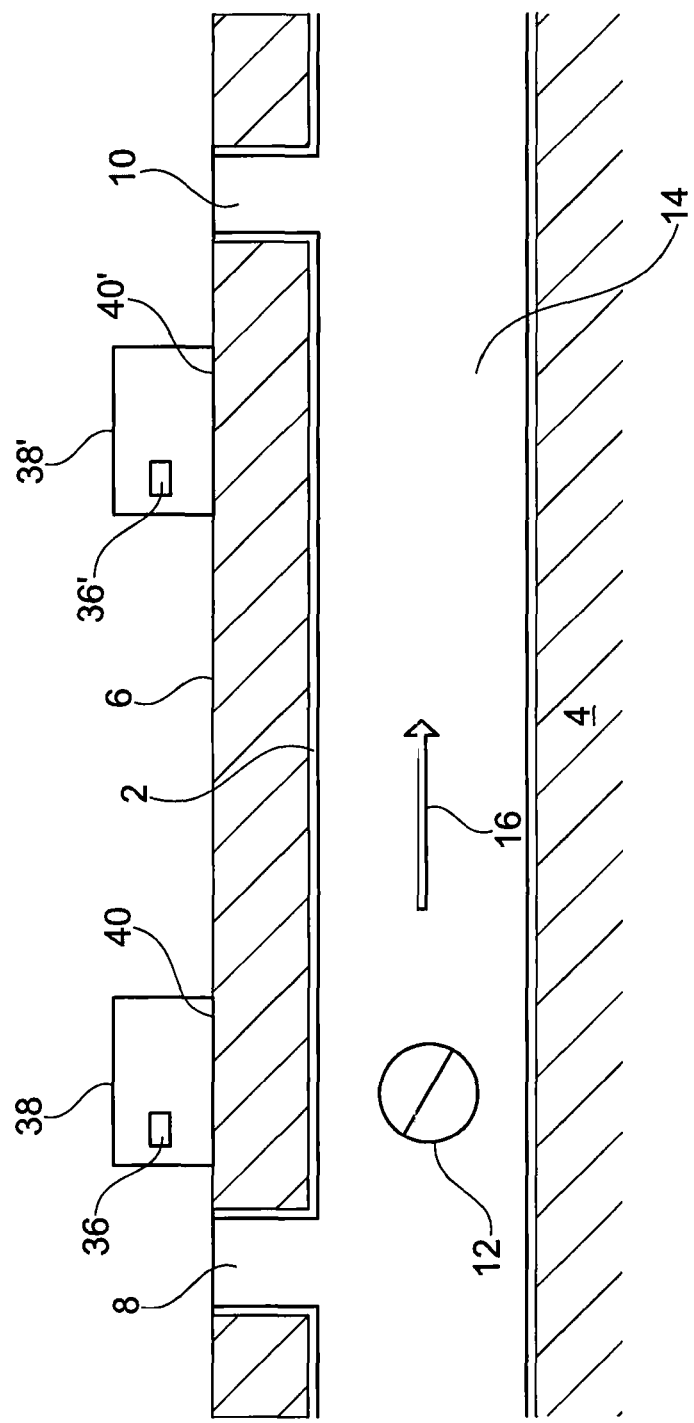
FIG. 1 illustrates a device in accordance with an embodiment of the present invention located within a pipeline.
Figure 2:
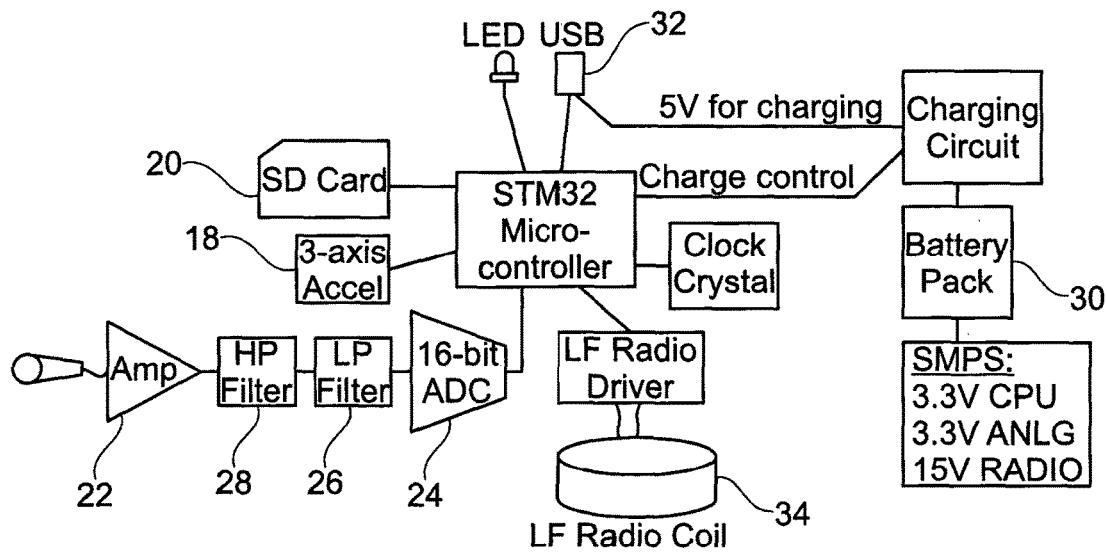
FIG. 2 illustrates a schematic of the components of a device in accordance with an embodiment of the present invention.

Referring now to FIG. 1, there is illustrated in schematic manner a use of the device and apparatus in accordance with the invention. In this arrangement, there is provided a pipeline (2) within the ground (4) and under the surface (6). The pipeline may be of a number of kilometres in length and includes an entry port (8) and an exit port (10) for a device (12) that is provided to pass along the interior of the pipeline (2) along the passage (14) in the direction of fluid flow (16) along the pipeline (2). The device (12) is provided with substantially neutral buoyancy such that the flow of the fluid itself is sufficient to propel the device (12) from the entry port (8) to the exit port (10). The device (12) itself is provided with an outer housing having a cavity defined therein. A plurality of detection components are located within the cavity, with the housing being formed from at least two parts engaged in a sealed manner and forming a substantially continuous external wall of the device (12), wherein said device further comprises an accelerometer (18) located within the cavity. The component parts of the device (12) are set out in schematic form in FIG. 2.

The accelerometer (18) is provided to indicate a change in velocity of the device (12). Such a change in velocity can then be attributed to various features of the pipeline (2) through which the device (12) passes, for example, bends of varying degrees, or changes in the diameter of the pipeline through which the device passes. Typically, the detection of such features of the pipeline will provide a more accurate determination of the device within the pipeline. Thus, the accelerometer (18) is provided in order to ascertain the location of the device (12) within the pipeline (2). The accelerometer (18) is typically provided as a 3-axis accelerometer and is generally capable of measuring +/−16 g at up to 3200 Hz. The accelerometer (18) also has the capability to detect movement of the device (12) by a user and can then switch the device from a powered down or sleep mode, when not in use, to a powered up or active mode when in use. The device may also be selectively switched to the powered up or active mode, via a switch in the interior of the device.

The device (12) is further provided with a removable data storage means, which is provided in the form of a memory card. Typically, the memory card is provided as a non-volatile memory card, in particular, a Secure Digital (SD) card (20). The data obtained by the accelerometer is then stored on the SD card.

Further included in the device (12) are acoustic detection means, which are located within said cavity. Theses acoustic detection means are provided in the form of a microphone. The acoustic detection means are further provided with amplifying means (22), which are provided to amplify an input signal for an analogue-to-digital converting means (24), also provided with the acoustic detection means of the device. Further, audio filtering means are provided with said acoustic detection means. Typically, the audio filtering means are in the form of a low-pass filter (26) and a high-pass filter (28). Thus, the provision of audio filtering means serves to amplify, pass or attenuate selected frequencies, improving the quality of the acoustic data obtained by the acoustic detection means in the device (12). The low-pass and/or high-pass filters (26, 28) may have fixed values or, alternatively, either or both can be programmable to a required value. Data obtained by the acoustic detection means is subsequently stored on the SD card (20) located within the device (12). The device (12) may also be programmed to record acoustic data for a predetermined duration of time. This predetermined duration of time is based on a predicted duration of time the device (12) will take to travel between selected points (8, 10) in the pipeline (2).

The device (12) is further provided with at least one data transfer connection means in the form of one or more USB ports (32). These may also be provided as one or more USB mini ports. The USB ports (32) are provided primarily for the transfer of data, for example, between the device and a PC, laptop, smartphone and/or the like, but also, additionally or alternatively, they can also be provided to enable charging of a power supply (30) associated with the device (12). Such a power supply (30) is located within the housing of the device (12) and is generally a rechargeable power supply. The power supply (30) includes one or more batteries, typically four batteries of the AA type. Specifically, the preferred AA batteries are NiMH batteries.

A real-time clock is provided within the housing of the device (12) and is capable of retaining the time for as long as a power supply (30) is connected to the device (12). The time of said clock can be input/adjusted by a user. The device (12) may also be provided in varying sizes according to the size/diameter of the pipeline (2) through which it is to be inserted. In general, the device will be sized to fit within the pipeline (2), though will be of a size greater than that of any secondary pipelines branched from the main pipeline (2).

The device (12) is provided with substantially neutral buoyancy in a fluid that passes along the pipeline (2), such that the device is carried by the fluid along the pipeline, and the acoustic data which is collected is used to generate an indication of any leakage that may be occurring from the pipeline (2) and also to provide an indication of the particular location of the device (12) and hence allow the calculation of the location of the leakage to be achieved. This arrangement allows the device (12) to be carried by the fluid and, therefore, the device does not need to be provided with any guide means so as to guide the position of the same in the pipeline and also does not need to be provided with any propulsion means as the movement of the fluid allows the device to be propelled along the pipeline.

An electromagnetic coil (34) is located within the cavity of the device (12), together with control means for the coil. The electromagnetic coil (34) is provided so as to facilitate the transmission and reception of data from a second electromagnetic coil, which will be located at an external location. A signal that is emitted from the electromagnetic coil (34) is received by a second electromagnetic coil (36) located within a detection means (38) at a fixed location (40). The fixed location (40) is generally above ground and directly above the pipeline (2) through which the device (12) is travelling. Two or more detection means (38, 38') are located at fixed locations (40, 40') along at least part of the length of the pipeline (2).

Although only two such locations are shown it should be appreciated that the number of locations and the spacing of the same can be selected with respect to the pipeline length, the size of the pipeline, the terrain of the ground above the pipeline or any other relevant parameters. It should also be appreciated that vehicle mounted or hand held variations of these fixed locations may be provided for specific requirements such as perhaps, finding the specific location of the device within the pipeline.

Figure 3:
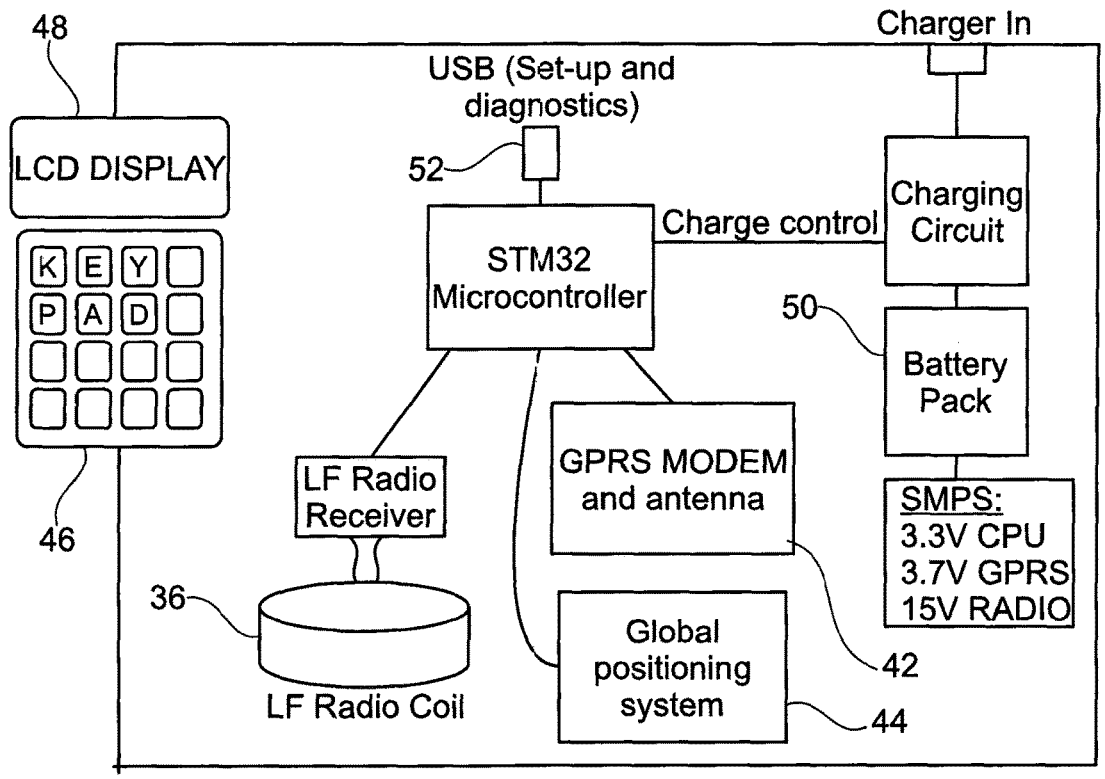
FIG. 3 illustrates a schematic of a detection means in a fixed location in accordance with an embodiment of the present invention.

Further features of the detection means (38) are shown in schematic form in FIG. 3. The detection means (38) further includes a general packet radio service (GPRS) modem (42) and/or a global positioning system (GPS) (44). Thus, as the device (12) passes along a portion of the pipeline (2) where a detection means (38) is located above-ground, the detection means (38) detects the presence of the device (12) via data received through the electromagnetic coils (34, 36) and subsequently provides a time-stamp and location for such a detection event. Provision of a GPRS modem (42) allows the detection means (38) to send, for example, one or more SMS messages and or internet data relating to the device/detection event. The detection means (38) may also be programmed to send such data to one or more mobile phones and/or servers. The above-ground detection means (38) further includes audio output means, which emit a sound when a detection event occurs. The acoustic detection means provided within the device (12) will subsequently "hear"/pick up the said sound as it passes through the relevant portion of the pipeline (2). Thus, the sound is then recorded on the obtained audio data, allowing a user to more accurately assess the location of the device (12) and, subsequently, the location of any leaks within the pipeline (2) relative to the detection means (38) which emits the sound. Additionally, each separate detection means (38, 38') located above-ground and along the path of the pipeline (2) may be programmed to emit a slightly different sound, making each sound unique to a particular detection means and therefore enabling better identification of the location of the device (12) within the pipeline (2) when analysing the audio data.

The detection means (38) is further provided with a user interface in the form of a keypad (46) and LCD display (48). The detection means (38) and the components contained therein may switched on/powered-up/activated by a user operating the keypad (46). Such operation may be simply pressing an "on" button located on the keypad or, preferably, a passcode would be required to be input in order to operate the detection means (38). The LCD display (48) will display, amongst other items, a status screen that includes the amount of charge remaining in a battery unit (50) required to power the detection means (38), which may be similar in design to the one that powers the device (12), and GPRS signal strength. A menu will subsequently be displayed providing the user with the option of inputting one or more telephone numbers, generally mobile telephone numbers, which will be sent SMS messages from the detection means (38), via the GPRS modem (42) when a detection event occurs. Usually, at least one of the telephone numbers input into the detection means will be that of a GPRS modem attached to a PC. Additional numbers will allow field-based operators to receive instant notification of a detection event so that they can prepare to extract the device (12) from the pipeline (2), if required.

The menu of the LCD display (48) also provides the option of allowing the operator to set an IP address of a server that would receive a user datagram protocol (UDP) internet message from the detection means (38) when a detection event occurs. The keypad (46) also allows the operator to scroll through stored detection events, allowing the retransmission of any that have not been sent to the server, either in error or for any other reason. Events that have been sent successfully may then be deleted. It would be possible for the detection means (38) to store up to a hundred or even more detection events before deleting the oldest events automatically in order to make room for newly detected events.

The detection means (38), like the device (12) is further provided with at least one data transfer connection means in the form of one or more USB ports (52). These may also be provided as one or more USB mini ports. The USB ports (52) are provided primarily for the transfer of data, for example, between the device and a PC, laptop, smartphone and/or the like. In particular, an operator may connect a laptop to the detection means (38) while out in the field in order to set-up and program the software or run diagnostics etc. This therefore negates the need to remove the detection means (38) from its location (40) every time check-ups/diagnostics/recalibrations etc. need to be run, saving time and money.

It should be noted that although the use of the device is of particular advantage in relation to the determination of the occurrence of leakages within a pipeline, the device can be used for other purposes in which the detection of acoustical noise is of advantage and there is a need to determine the particular location of the occurrence of the noise.

The invention claimed is:

1. Apparatus for detecting one or more parameters of a pipeline, said apparatus comprising:
   a device having a housing;
   a cavity defined within said housing;
   a plurality of detection components located within said cavity,
   said housing formed from at least two parts engaged in a sealed manner and forming a substantially continuous external wall of the device,
   wherein said device further comprises an accelerometer located within said cavity to indicate changes in velocity and/or location of the device moving along the interior of the pipeline and a detected change in velocity is attributed by processing means to one or more parameters of the pipeline through which the device passes wherein the device includes a timer and is controlled to record acoustic data for a predetermined duration of time determined with respect to a predicted time for the device to travel between a point of introduction into the pipeline and point of exit from the pipeline.

2. Apparatus according to claim 1 wherein the accelerometer is provided as a 3-axis accelerometer.

3. Apparatus according to claim 1 wherein a switch on the device is actuated prior to launching the device into the pipeline and actuation of the switch to turn the device off is performed once the device has been removed from the pipeline.

4. Apparatus according to claim 1 wherein the device is provided with a data storage means for the storage of data from the accelerometer and/or other sensing means provided in the device.

5. Apparatus according to claim 4 wherein the data storage means is removable from the device to access data thereon.

6. Apparatus according to claim 4 wherein the data storage means can be accessed from externally of the device by use of a wireless data communication or via a cable and plug located in a socket on the device.

7. Apparatus according to claim 1 wherein the device includes acoustic detection means located within said cavity and amplifying means and/or filtering means for the audio data collected by the acoustic detection means.

8. Apparatus according to claim 7 wherein the acoustic data which is collected is used to generate an indication of any leakage that may be occurring from the pipeline and/or to provide an indication of a particular location of the device and hence allow calculation of the location of leakage to be achieved.

9. Apparatus according to claim 1 wherein at least one port is provided to enable charging of a power supply provided within the housing of the device.

10. Apparatus according to claim 1 wherein the device is provided with an electromagnetic coil and control means for said coil to facilitate the transmission and reception of data from a second electromagnetic coil located at an external location substantially directly above the pipeline through which the device is travelling such that a signal emitted from the first electromagnetic coil is received by the second electromagnetic coil.

11. Apparatus according to claim 10 wherein a third electromagnetic coil is located at a location spaced along the pipeline from the location of the second electromagnetic coil.

12. Apparatus according to claim 10 wherein a general packet radio service (GPRS) modem and/or a global positioning system (GPS) is provided in association with the second and/or third electromagnetic coil locations to detect when the device passes an electromagnetic coil, a location and a time-stamp of the time that the device passed said second and/or third electromagnetic coils.

13. Apparatus according to claim 10 wherein the device emits a sound when a detection event occurs and which is detected by an acoustic detection means provided with the device and recorded on the device storage media to allow a user to assess the location of the device and, subsequently, the location of any leaks within the pipeline relative to the location at which the device emitted the sound.

14. Apparatus according to claim 1 wherein the device is provided to have substantially neutral buoyancy in a fluid that passes along the pipeline, such that the device is carried by the fluid along the pipeline.

15. Apparatus according to claim 1, wherein the plurality of detection components located within said cavity includes acoustic detection means comprising audio filtering means.

16. Apparatus according to claim 15 wherein said audio filtering means are provided in a form of one or more low-pass and/or high-pass filters to amplify, pass or attenuate selected frequencies.

17. Apparatus according to claim 16 wherein the acoustic detection means are further provided with amplifying means to amplify an input signal for an analogue-to-digital converting means.

18. A method for the detection of one or more parameters in a pipeline, said method comprising the steps of:
inserting a device into said pipeline, said device having a plurality of detection components located therein, the device being formed from at least two parts engaged in a sealed manner to form a substantially continuous external wall of the device; and
providing detecting means at one or more locations along a path of said pipeline and externally thereof, said detecting means detecting the presence of the device within the pipeline passing within a predetermined proximity of the detecting means, and wherein said device includes an accelerometer located therein, a first electromagnetic coil and control means for the same to facilitate transmission and reception of data between said first electromagnetic coil and an electromagnetic coil provided as part of said detecting means and wherein the device is controlled to record acoustic data for a predetermined duration of time determined with respect to a predicted time for the device to travel between a point of introduction into the pipeline and apoint of exit from the pipeline.

19. A method according to claim 18 wherein the detecting means are provided at at least two spaced apart locations along at least part of a length of the pipeline.

20. A method according to claim 18 wherein the detecting means when the device is detected as being in proximity with the detecting means, emits a sound which capable of being detected by audio detection means in the device and which sound is recorded along with a timestamp so as to provide an indication on a device storage means of a time at which the sound was recorded and at which the device was in proximity to the detecting means.

* * * * *